UNITED STATES PATENT OFFICE.

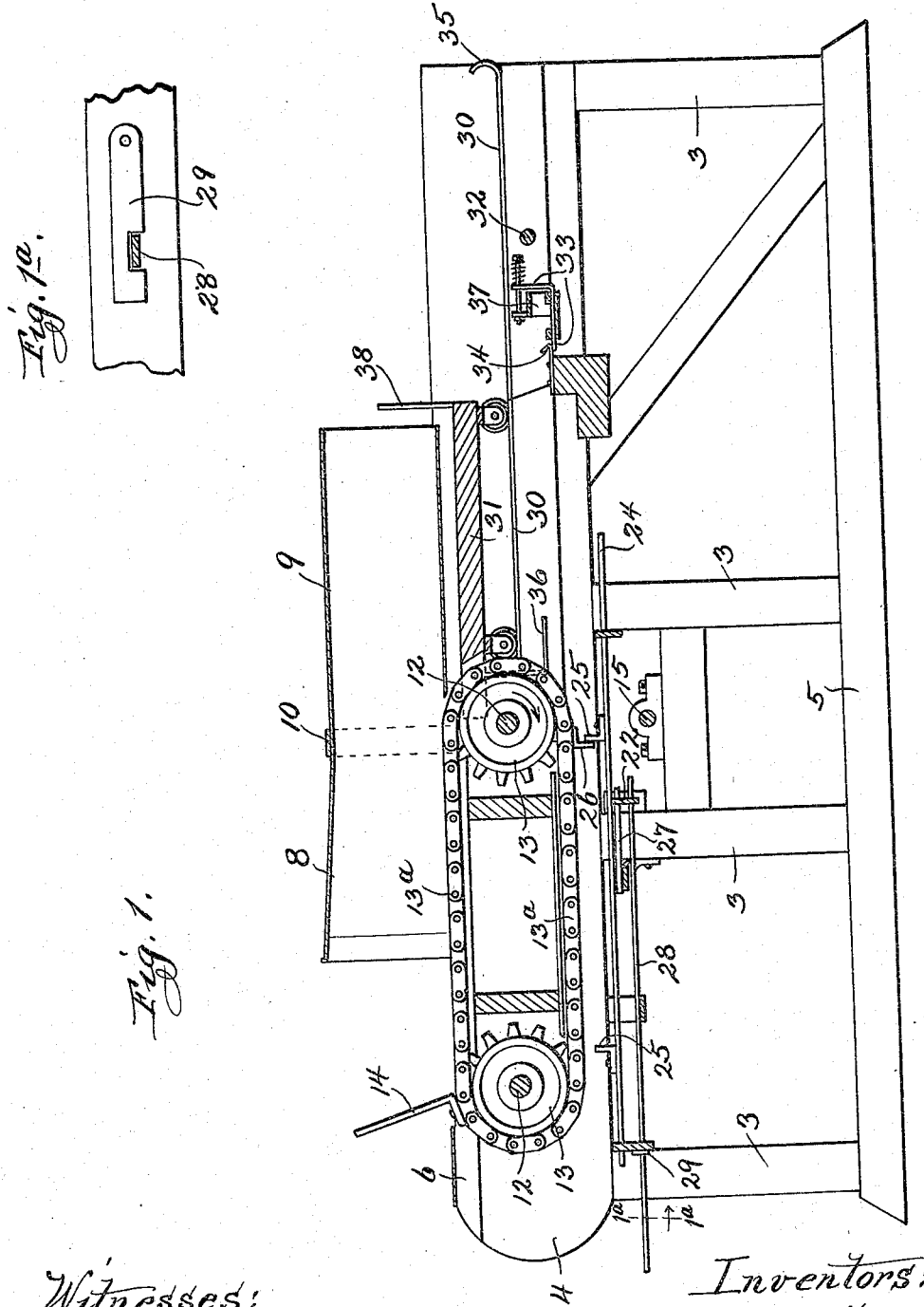

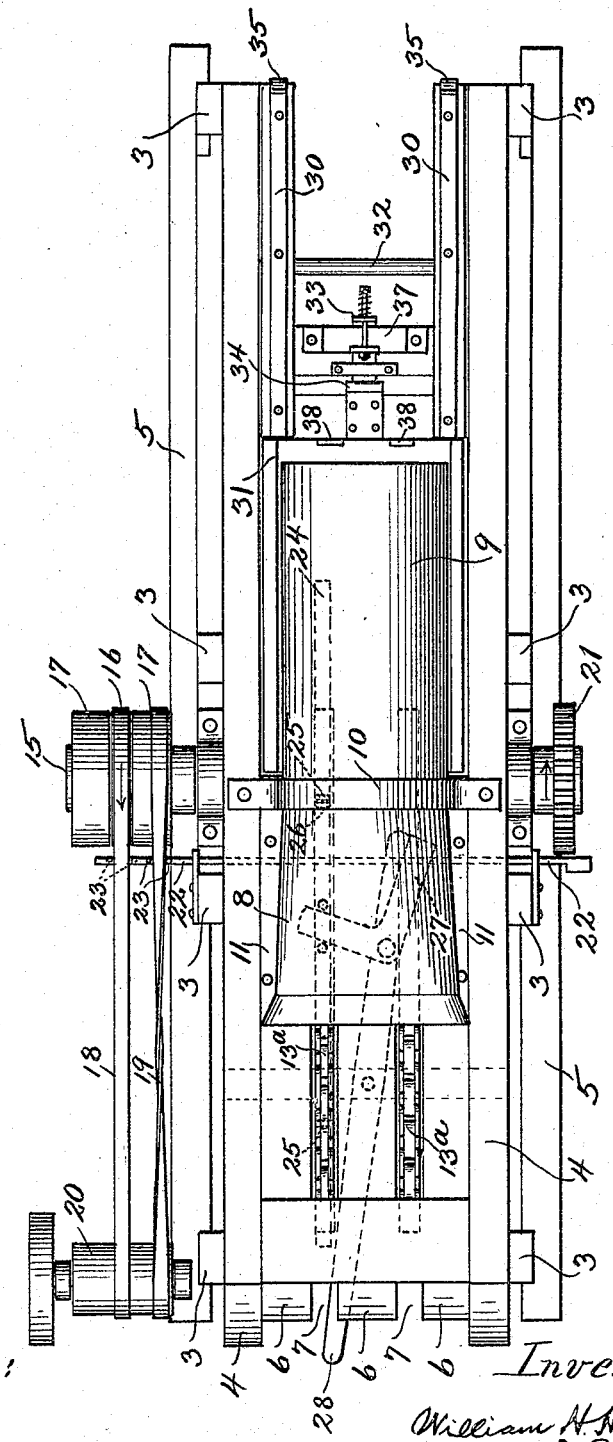

WILLIAM H. HANSEN AND ALBERT J. PRICE, OF CHICAGO, ILLINOIS.

BALING-MACHINE.

942,257.     Specification of Letters Patent.     Patented Dec. 7, 1909.

Application filed March 3, 1909. Serial No. 481,110.

*To all whom it may concern:*

Be it known that we, WILLIAM H. HANSEN, and ALBERT J. PRICE, of Chicago, Illinois, have invented certain new and useful Improvements in Baling-Machines, of which the following is a specification.

Our invention relates to machines for baling original small packages of flour, salt or the like of uniform size to form bales or large packages. This is ordinarily done by packing a lot of such small packages in a sack or canvas covering by hand.

The chief object of our invention is to provide a machine for doing such work. We have attained this object by the machine constructed as illustrated in the accompanying drawing in which—

Figure 1 is a vertical longitudinal section of a machine embodying our invention. Fig. 1$^a$ is a detail showing a section at line 1$^a$ 1$^a$ of Fig. 1. Fig. 2 is a top or plan view of the machine.

Similar signs marked on the several views refer to like parts.

A suitable frame is provided consisting of uprights, 3, side pieces 4, and bottom pieces 5 connected together and properly braced against racking. At the front end and for a suitable length along the frame the space between the side pieces is provided with top pieces 6 arranged to form a platform provided with longitudinal slots 7. On this slotted platform is mounted a flaring slightly tapering hood-like structure 8 which terminates in a slightly flattened filling tube 9. The hood mounting consists preferably of a strong band-like piece 10 secured to the hood at its junction with the filling tube and bolted to the frame, and flanges 11 of the hood bolted to the slotted platform, so that the hood will carry the filling tube and hold it extended free of the platform and frame.

The hood is designed and adapted to compress together a lot of small packages of uniform size sufficient to fill its cross section by having the same forced through it from the large to the small end and to deliver the same into the filling tube so as to fit and fill its cross section. The bale covering, a canvas sack, is drawn over the filling tube so that when said small packages are forced through said tube they will be delivered into the covering and will fill its cross section and push it off of said tube.

The larger or flaring end of the hood is open and unobstructed by a cover or any rigid part of the machine so that a pack of original small packages placed on the platform or presented at the large end can be pushed into the hood. The taper of the hood interior is uniform and adapted to compress the packs laterally and gradually as they are pushed through it to make them closely fit the bore of the tube. There should be no abrupt or sudden contraction of the passage way anywhere throughout the hood and tube such as would tend to disarrange the packs, or retard their passage any more than is produced by the uniform taper of the hood to compress them in the manner described to make them closely fit in the tube. The hood and tube are arranged horizontally in the machine.

Journaled in the side pieces of the frame are shafts 12 carrying sprocket wheels 13 over which sprocket chain belts 13$^a$ are applied so as to work in the platform slots 7. The chains carry upwardly-projecting arms 14 which travel back and forth along the platform and through the hood so that a pack of small packages placed orderly together upon the platform between the flaring open end of the hood and the ingoing arms will be caught by the latter and forced through into the filling tube 9.

The driving mechanism consists of a shaft 15 which, at one end, is provided with a fixed pulley 16 and two loose pulleys 17. These are provided with a straight belt 18 and a twisted belt 19 extending to a power pulley 20. The other end of shaft 15 is geared with the cogged gear 21 of the rearmost of the shafts 12.

A sliding bar 22 is mounted on the frame and provided with arms 23 adapted to engage the belts 18 and 19 and to shift said belts alternately from the fast to the loose pulley as said sliding bar is shifted in opposite directions. By this means the motion is reversed so as to cause the arms 14 to oscillate in the slots 7 throughout the length of the slotted platform. Means for automatically causing this shifting movement comprises a sliding bar 24 mounted on the frame immediately below one of the sprocket chains 13$^a$ and provided with lugs 25 which are adapted to engage a lug 26 on said chain. A bell-lever 27 (dotted lines Fig. 2) mounted on the frame has one of its arms connected with the sliding bar 22 and the other with said sliding bar 24, the arrangement being such that the lug 26 traveling in one direction and striking one of the lugs 25 will cause the belts 18 and 19 to be shifted and reverse the movement, and when traveling in the other direction will produce a substantially similar effect in the other direction, thus automatically producing a constant oscillating movement of the arms 14 along the slotted platform and back and forth through the hood.

We have further provided means for setting the belts 18 and 19 on the loose pulley 17 so that the machine may remain at rest without shutting off the power. This consists of a lever 28 mounted on the frame and connected at one end with the sliding bar 22, the other end being provided with a latch or locking means at 29 (Fig. 1ª) whereby it may be held so as to keep the arms 23 in the required position to keep the belts 18 and 19 in the neutral position.

At the rear the frame is provided with a track 30 upon which a truck 31 is placed and adapted to travel back and forth under the filling tube 9. The track is divided into two car lengths, the rear length being supported on a rock shaft 32 upon which it may tilt. The rear length is provided with a spring-latch 33 which is adapted to engage automatically with a suitable catch 34, or beveled striking plate, on the frame when said rear length of the track is turned up to a level position. The said rear length is provided with buffers 35 at the extreme rear end which are adapted to prevent the rear wheels of the truck from passing clear off of the track.

The front of the truck is provided with an arm 36 which is adapted to strike the upright part of latch 33, when the truck is moved sufficiently back on the track and unlatch said rear length. When this occurs the rear wheels of the truck strike the buffers 35, the truck is unbalanced on the rock-shaft so that the said rear length and truck will together tilt from a horizontal to a vertical position. In this position the truck is held at the lower end to said rear length by the wheels resting on the buffers 35 which are curved back to prevent the wheels from rolling off, and at the upper end by a keeper 37 which the arm 36 passes under before striking the latch 33, so as to engage said keeper and prevent the upper end of the truck from falling away from the track.

The rear end of the truck is provided with stakes 38 designed to prevent the load from slipping off when the truck is so tilted.

The size of the hood and filling tube in cross section is adapted to the size of the small packages so that a given number of the packages laid two or three in a line and piled correspondingly upon one another across the platform will substantially fill the cross section of the hood at the large end, and being forced through to the small end and into the filling tube will be compressed transversely of the hood so as to take up all the looseness and cause a close fit of the pack in said tube. Preferably the length of the filling tube corresponds with the length of the bale which also, preferably corresponds in length with a definite number of the small packages laid lengthwise in the tube. The weight and friction of the packages in the hood and tube yield all desired endwise compression.

The bale covering is drawn over the filling tube and has its bottom resting against the stakes 38 of the truck shoved under the tube. The length of the truck also preferably corresponds with the length of the bale.

The feeding of the machine consists in the regular and orderly piling of the small packages across the slotted platform as before described in front of the arms 14 when they are moving toward the hood. The volume required to fill the bale is forced through the filling tube by repeated impulses of said oscillating arms the number varying as the feeding varies. As the bale is pushed off of the tube it rests upon the truck and is thereby carried back until the truck is tilted. This operation squarely separates the packages in the bale covering from those remaining in the filling tube at the end of said tube. Then the feeding is stopped, another bale sack is drawn over the tube, the truck turned up to horizontal and pushed back under the filling tube, and the feeding resumed. The oscillating motion of the arms is continuous and does not stop during any of the other operations unless the lever 28 is set in neutral position.

The hood and filling tube are preferably made detachable from the frame in order to substitute different sizes when changes in the sizes of small original packages are made, as when a pack of a given number would not fill the cross section of the filling tube.

What we claim is:

1. In a machine of the class described, the combination of a hood having an open end and a uniformly tapered interior with a filling tube attached at the termination of the uniform taper and an oscillating member adapted to force packs of small original packages through the hood and into the filling tube, as specified.

2. In a machine of the class described, the combination with a horizontal platform of a hood having an open end and a uniformly-tapered interior with a filling tube attached at the termination of the uniform taper, an oscillating member adapted to travel on the platform and through the hood, and mechanism for operating the oscillating member, as specified.

3. In a machine of the class described, the combination with a slotted platform, a tapering hood and a filling tube of a belt in the slotted platform, a pusher on the belt and mechanism for producing oscillating movement of the belt as specified.

4. In a machine of the class described, the combination with a platform, an open-ended hood provided with a uniformly tapered interior, a filling tube attached to the hood at the termination of the uniform taper, an oscillating member and mechanism for operating the same for forcing packs of original small packages from the platform into and through the hood and filling tube by repeated impulses, as specified.

5. In a machine of the class described the combination with the filling tube of a truck, a two truck length divided track, a pivoted support for the rear length of track and a latch and tripping device as specified.

6. In a machine of the class described, the combination of the platform with a tapering hood and a filling tube, an oscillating member, mechanism for continuously working the oscillating member and a tilting truck adapted to travel back and forth under the filling tube at its discharge end as specified.

WILLIAM H. HANSEN.
ALBERT J. PRICE.

Witnesses:
ALFRED W. WALSON,
SARA MORAN.